US012736971B1

(12) United States Patent
Wood

(10) Patent No.: US 12,736,971 B1

(45) Date of Patent: Sep. 15, 2026

(54) SYSTEM AND METHOD FOR RANGING AN OBJECT

(71) Applicant: BAE SYSTEMS INFORMATION AND ELECTRONIC SYSTEMS INTEGRATION INC., Nashua, NH (US)

(72) Inventor: Benjamin P. Wood, Bedford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 886 days.

(21) Appl. No.: 17/725,268

(22) Filed: Apr. 20, 2022

(51) Int. Cl.
*G01S 17/933* (2020.01)
*G01S 13/935* (2020.01)
*G05D 1/00* (2006.01)

(52) U.S. Cl.
CPC ............ *G05D 1/106* (2019.05); *G01S 13/935* (2020.01); *G01S 17/933* (2013.01); *G05D 1/104* (2013.01)

(58) Field of Classification Search
CPC ...... G05D 1/106; G05D 1/104; G01S 13/935; G01S 17/933
See application file for complete search history.

(56) References Cited

U.S. PATENT DOCUMENTS

| | | | | |
|---|---|---|---|---|
| 7,187,434 | B2 * | 3/2007 | Ohtomo | G01S 17/08 356/5.04 |
| 8,330,942 | B2 * | 12/2012 | Nordenfelt | G01S 17/66 356/3.01 |
| 8,378,276 | B2 | 2/2013 | Lam | |
| 8,665,122 | B2 * | 3/2014 | Klepsvik | G01S 17/93 701/400 |
| 9,576,484 | B2 * | 2/2017 | Chung | G01S 17/88 |
| 9,933,782 | B2 * | 4/2018 | Mathew | G05D 1/0094 |
| 10,466,024 | B1 | 11/2019 | Choiniere et al. | |
| 10,533,831 | B1 | 1/2020 | Choiniere et al. | |
| 10,775,143 | B2 | 9/2020 | Choiniere et al. | |
| 11,009,316 | B2 | 5/2021 | Lam | |
| 11,054,505 | B2 * | 7/2021 | Droz | G01S 7/4817 |
| 11,178,395 | B1 | 11/2021 | Lam | |
| 11,199,387 | B2 | 12/2021 | Choiniere et al. | |
| 11,243,058 | B2 | 2/2022 | Choiniere et al. | |
| 2004/0233414 | A1 * | 11/2004 | Jamieson | G01S 17/42 356/140 |

(Continued)

OTHER PUBLICATIONS

DE 102018102281 A1 with English translation. Date filed Feb. 1, 2018. Date published Aug. 9, 2018. (Year: 2018).*

(Continued)

*Primary Examiner* — Calvin Cheung

(74) *Attorney, Agent, or Firm* — Sand, Sebolt & Wernow LPA; Gary McFaline

(57) ABSTRACT

Object ranging employing platforms having passive sensors to track the object moving towards the platforms. A wireless communication link enables the sharing of data between the platforms to determine the position or location of the object. The position of the object is provided in the form of closed-form function of time. A range-rate is derived from the closed-form function of time. Then, the system and method approximates a time-to-go until a collision point between the object and one of the platforms. The time-to-go is based on a ratio of range to range-rate.

19 Claims, 3 Drawing Sheets

(56) References Cited

U.S. PATENT DOCUMENTS

2011/0204178 A1* 8/2011 Glaros .................... F41G 7/226
244/3.13
2017/0235316 A1* 8/2017 Shattil .................. B64C 39/024
701/3
2018/0128621 A1* 5/2018 Kwon .................. G01S 13/723
2018/0172815 A1* 6/2018 Mckitterick .......... G01S 13/343
2019/0072985 A1* 3/2019 Taveira .................. G08G 1/164
2019/0137219 A1* 5/2019 Bockmon ................. F41G 5/16
2019/0227540 A1* 7/2019 Suvitie ................... G05D 1/104
2020/0334850 A1* 10/2020 Ross .................... H04N 23/695

OTHER PUBLICATIONS

JP 2016105557 A with English translation. Date filed Dec. 1, 2014. Date published Jun. 9, 2016. (Year: 2016).*

* cited by examiner

SYSTEM AND METHOD FOR RANGING AN OBJECT

TECHNICAL FIELD

The present disclosure relates generally to object ranging. More particularly, the present disclosure relates to object ranging to determine a time-to-go or time until a collision by way of object tracking via sensors.

BACKGROUND

When a single platform is flying, it should have the intelligence capabilities to discriminate and determine objects moving near the platform. These capabilities should include a capability to determine whether the object is moving towards the platform or in another direction that is of no consequence to the platform. Currently, active sensors, such as Light Detection and Ranging (LIDAR) and radar, are active sensors utilized to assist in the determination of whether an object is moving towards the platform.

In addition to the active sensors on the platform, the platform often carries passive sensors as well. Optical sensors or optical imagers are one exemplary type of passive sensor on the platform that capture imagery and data that is used for surveillance and other object recognition techniques.

It is also known that when there are other platforms in the vicinity (such as two or more aircraft flying in formation), the platforms each need to detect objects, such as threats, that are incoming thereto. However, because of the close spacing of the platforms flying in formation, relative to the object off in the distance, this can be difficult due to objects at a sufficient distance may appear to be targeting both platform based on their close proximity.

When there are platforms flying in formation, it is often the case that each platform has onboard passive sensors, such as infrared cameras, that are used to observe distant landscape that can include an object or projectile moving towards the platform or platforms. The platforms in some cases are able to share data over a wireless communication link or provide such information to a centralized location.

Previously, the task of determining range, range-rate, and time-to-go of an incoming object was a challenging problem when there is a fast-moving object and the time until collision is short. This was problematic because when there are multiple platforms, the sensors are taking multiple measurements and sharing them over a data link, then feeding them into a state estimation filter. The time requirements involved in obtaining the data and determining the object information may not enable corresponding instructions to counter the incoming object. There is usually large errors associated with the triangulated position measurements because there are multiple sensors or cameras that have angle errors and other uncertainties related to the locations of the platforms relative to each other. Additionally problematic was the location and position with which the sensors are facing at the time the image is captured. Stated otherwise, all of these errors needed to be accounted for or filtered out to obtain true angle measurements. Thus, the high number of error sources resulted in very noisy triangulated positions. These triangulated positions, which contain a high level of noise or error, were then used to determine the range of the object. Thus, the level of certainty or confidence in the result was low due to all the errors that needed to be accounted for to determine the range of the object. To obtain a range-rate from this information, the ranges were typically differentiated or derived. However, taking the difference or derivative of a noisy or error-laden data stream results in a much more noisy or error-filled result. Stated otherwise, the previous techniques were problematic because they resulted in high noise results. Since the range-rate was significantly noisy in this previous technique, it limited the ability of this information to be applied usefully.

There has been research in techniques to perform angle only tracking and state estimation of object approaching a platform. A small subset of this research is concerned with combining multiple angle only measurements to estimate three dimensional position and velocity. This research is mostly concerned with the general case of tracking a target with unknown motion or motion bounded by acceleration limits. These prior methods that account for the range and range-rate components of the state estimate generally take too long to close for a quickly closing projectile. What is needed is a faster implementation to process the range and range-rate information so that the platform can take appropriate action.

SUMMARY

Determining range, range-rate, and time-to-go using passive sensors is a challenging problem, especially when the object being tracked is moving fast and timeline is limited. The present disclosure addresses this problem and other issues by providing offset sensors that triangulate the three dimensional position of the object. The information from the platforms may be transmitted or shared to each platform over a data link. The shared data may be combined to determine a 3D position for the object or projectile. This enables the system of the present disclosure to determine when the object is going to impact one of the platforms. Thus, the system of the present disclosure is able to result in a range-rate determination that is less noisy than was previously known. Some exemplary embodiments exclude the use of active sensors and can accomplish the object ranging with only one or more passive sensors.

As noted, prior methods that account for the range and range-rate components of the state estimate generally take too long to close for a quickly closing projectile. These prior methods did not assume an a priori target motion and direction. To address the problem of the resulting position estimates being too noisy to allow a useable range-rate and time-to-go to be estimated in a timely manner, the present disclosure exploits the fact that the incoming objects range will be a smooth and monotonically decreasing function of time and performs a polynomial curve fit to the local measurements. Taking the derivative of this polynomial then yields a smooth function approximating range-rate. Using range-rate thereby results in the time-to-go or time to impact. By assuming the object's motion characteristics a priori, the technique of the present disclosure can fit the measurements and acquire a closed form estimate of range that can be differentiated to get accurate range-rate and time-to-go much more quickly than previously known.

In accordance with one aspect, an exemplary embodiment of the present disclosure may provide a method comprising: detecting an object; tracking the object using a first passive sensor on a first platform and obtaining first angular data from tracking the object; determining a range of the object from the first platform as a closed-form function of time; deriving, a range-rate, from the closed-form function of time; and approximating a time-to-go until a collision point between the object and the first platform, wherein approximating the time-to-go is based on a ratio of range to range-rate. This exemplary embodiment or another exemplary embodiment may provide tracking the object using a second passive sensor on a second platform and obtaining second angular data from tracking the object; sharing at least one of the first angular data and the second angular data across a communication link between the first platform and the second platform; wherein determining the range of the object from the first platform as a closed-form function of time is accomplished by triangulating a position of the object based on the first angular data and the second angular data. This exemplary embodiment or another exemplary embodiment may provide generating the range and a range error in response to triangulating the position of the object based on the first angular data and the second angular data; and providing the range and the range error to a state estimator to create a filtered range. This exemplary embodiment or another exemplary embodiment may provide curve fitting a filter to a set of polynomial measurements representative of position of the object, wherein performing the curve fitting results in the closed-form function of time. This exemplary embodiment or another exemplary embodiment may provide sharing a message data type representative of a warning track of the object; wherein the sharing of the message data types occurs continuously between the first platform and the second platform for a period of time. This exemplary embodiment or another exemplary embodiment may provide wherein the message data type representative of the warning track of the object includes an indicator of a collision between one of the first platform and the second platform and the object. This exemplary embodiment or another exemplary embodiment may provide determining, via logic at the first platform, whether there is a corresponding warning track of the object located by the second passive sensor on the second platform. This exemplary embodiment or another exemplary embodiment may provide wherein determining whether there is the corresponding warning track is accomplished by determining whether there is inertially consistent similarity in the corresponding track from the second passive sensor and the warning track from the first passive sensor. This exemplary embodiment or another exemplary embodiment may provide matching the first angular data and the second angular data in response to a determination that there is inertially consistent similarity in the corresponding track from the second passive sensor and the warning track from the first passive sensor; triangulating the position of the object in response to matching the first angular data and the second angular data. This exemplary embodiment or another exemplary embodiment may provide wherein approximating the time-to-go until the collision point between the object and the first platform based comprises estimating acceleration or deceleration of the object relative to the first platform. This exemplary embodiment or another exemplary embodiment may provide providing estimated acceleration or deceleration of the object to a state estimator to create a filtered range. This exemplary embodiment or another exemplary embodiment may provide wherein providing estimated acceleration or deceleration of the object to the state estimator occurs subsequent to deriving the range-rate. This exemplary embodiment or another exemplary embodiment may provide providing a signal representative of the time-to-go to a counter measure system. This exemplary embodiment or another exemplary embodiment may provide presuming, based on a priori knowledge from the object having been detected, that the object is moving toward the first platform. This exemplary embodiment or another exemplary embodiment may provide determining a position of the object based on tracking the object using the first passive sensor; curve fitting a function from noisy measurements from determining the position of the object, wherein curve fitting the function generates a smooth curve that approximates expected behavior of the moving object.

In another aspect, another exemplary embodiment of the present disclosure may provide an object ranging method comprising: tracking an object that is moving via a first passive sensor on a first platform; obtaining first angular data of the object relative to the first platform via the first passive sensor; tracking the object via a second passive sensor on a second platform; obtaining second angular data of the object relative to the second platform via the second passive sensor; triangulating a location of the object based on first angular data from the first passive sensor and the second angular data from the second passive sensor and obtaining a smooth and monotonically decreasing closed-form function representative of a range of the object based on its location at a point in time; performing a polynomial curve fit of the first angular data relative to the smooth and monotonically decreasing function; taking a derivative of the polynomial curve fit of angular data to that results a smooth function approximating a range-rate of the object. This exemplary embodiment or another exemplary embodiment may provide approximating a time-to-go until a collision point between the object and the first platform based, wherein approximating the time-to-go is based on a ratio of range to range-rate.

In yet another aspect, another exemplary embodiment of the present disclosure may provide an object ranging system: a first platform; a first passive sensor on the first platform, wherein the first passive sensor is configured to track an object located remotely from the first platform; first spatial data logic on the first platform to generate first angular data of the object relative to the first platform, wherein the first angular data generated based on raw imagery from the first passive sensor; first ranging logic on the first platform to determine a location of the object relative to the first platform based on the first angular data; first wireless communication logic on the first platform; a second platform configured to move in formation with the first platform; a second passive sensor on the second platform, wherein the second passive sensor is configured to track the object located remotely from the second platform; second spatial data logic on the second platform to generate second angular data of the object relative to the second platform, wherein the second angular data generated based on raw imagery from the second passive sensor; second ranging logic on the second platform to determine the location of the object relative to the second platform based on the second angular data; second wireless communication logic on the second platform, wherein the first wireless communication logic and the second wireless communication logic establish a wireless link for transfer of data between the first platform and the second platform; wherein one of the first ranging logic and the second ranging logic derives a range of the object from one of the first platform and the second platform as a closed-form function of time, and thereafter derive a range-rate of the object relative to one of the first platform and the second platform as a function of time; wherein one of the first ranging logic and the second ranging logic approximates a time-to-go until a collision point between the object and one of the first platform and the second platform, wherein approximation of the time-to-go is based on a ratio of range to range-rate. This exemplary embodiment or another exemplary embodiment may provide wherein one of the first ranging logic and the second ranging logic generates the range and a range error in response to determination of the location of the object based on the first angular data and the second angular data; and a state estimator that is provided the range and the range error to create a filtered range; wherein one of the first ranging logic and the second ranging logic curve fits a filter to a set of polynomial measurements represented by at least, wherein performing the curve fitting results in the closed-form function of time. This exemplary embodiment or another exemplary embodiment may provide a message data type that is shared across the wireless link, wherein the message data type is representative of a warning track of the object; wherein the sharing of the message data types occurs continuously between the first platform and the second platform for a period of time; wherein the message data type representative of the warning track of the object includes an indicator of a collision between the object and one of the first platform and the second platform; wherein the first ranging logic determines whether there is a corresponding warning track of the object located by the second passive sensor on the second platform, wherein determination of whether there is the corresponding warning track is accomplished by determining whether there is an inertially consistent similarity in the corresponding track from the second passive sensor and the warning track from the first passive sensor, and if consistent, then the first angular data and the second angular data are matched to triangulate the location of the object.

In yet another aspect, an exemplary embodiment of the present disclosure provides a computer program product including at least one non-transitory computer readable storage medium having instructions encoded thereon that, when executed by one or more processors, implement a process track an object, the process comprising: detecting the object; tracking the object using a first passive sensor on a first platform and obtaining first angular data from tracking the object; determining a range of the object from the first platform as a closed-form function of time; deriving a range-rate of the object from the closed-form function of time; and approximating a time-to-go until a collision point between the object and the first platform, wherein approximating the time-to-go is based on a ratio of the range to the range-rate. In this exemplary embodiment or another exemplary embodiment, the computer program product may further perform the method or process steps of tracking the object using a second passive sensor on a second platform and obtaining second angular data from tracking the object; and sharing at least one of the first angular data and the second angular data across a communication link between the first platform and the second platform; wherein determining the range of the object from the first platform as a closed-form function of time is accomplished by triangulating a position of the object based on the first angular data and the second angular data. In this exemplary embodiment or another exemplary embodiment, the computer program product may further perform the method or process steps of generating the range and a range error in response to triangulating the position of the object based on the first angular data and the second angular data; providing the range and the range error to a state estimator; and creating, via the state estimator, a filtered range based on the range and the range error. In this exemplary embodiment or another exemplary embodiment, the computer program product may further perform the method or process steps of curve fitting a filter to a set of polynomial measurements representative of position of the object, wherein performing the curve fitting results in the closed-form function of time. In this exemplary embodiment or another exemplary embodiment, the computer program product may further perform the method or process steps of sharing a message data type representative of a warning track of the object; wherein the sharing of the message data types occurs continuously between the first platform and the second platform for a period of time. In this exemplary embodiment or another exemplary embodiment, the computer program product may provide wherein the message data type representative of the warning track of the object includes an indicator of a collision between one of the first platform and the second platform and the object. In this exemplary embodiment or another exemplary embodiment, the computer program product may further perform the method or process steps of determining, via logic at the first platform, whether there is a corresponding warning track of the object located by the second passive sensor on the second platform. In this exemplary embodiment or another exemplary embodiment, the computer program product may further perform the method or process steps of determining whether there is inertially consistent similarity in the corresponding track from the second passive sensor and the warning track from the first passive sensor. In this exemplary embodiment or another exemplary embodiment, the computer program product may further perform the method or process steps of matching the first angular data and the second angular data in response to a determination that there is inertially consistent similarity in the corresponding track from the second passive sensor and the warning track from the first passive sensor; and triangulating the position of the object in response to matching the first angular data and the second angular data. In this exemplary embodiment or another exemplary embodiment, the computer program product may further perform the method or process steps of estimating acceleration or deceleration of the object relative to the first platform. In this exemplary embodiment or another exemplary embodiment, the computer program product may further perform the method or process steps of providing estimated acceleration or deceleration of the object to a state estimator to create a filtered range. In this exemplary embodiment or another exemplary embodiment, the computer program product may further provide that calculation of acceleration or deceleration of the object to the state estimator occurs subsequent to deriving the range-rate. In this exemplary embodiment or another exemplary embodiment, the computer program product may further perform the method or process steps of providing a signal representative of the time-to-go to a counter measure system. In this exemplary embodiment or another exemplary embodiment, the computer program product may further perform the method or process steps of presuming, based on a priori knowledge from the object having been detected, that the object is moving toward the first platform. In this exemplary embodiment or another exemplary embodiment, the computer program product may further perform the method or process steps of determining a position of the object based on tracking the object using the first passive sensor; and curve fitting a function from noisy measurements from determining the position of the object, wherein curve fitting the function generates a smooth curve that approximates expected behavior of the moving object.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
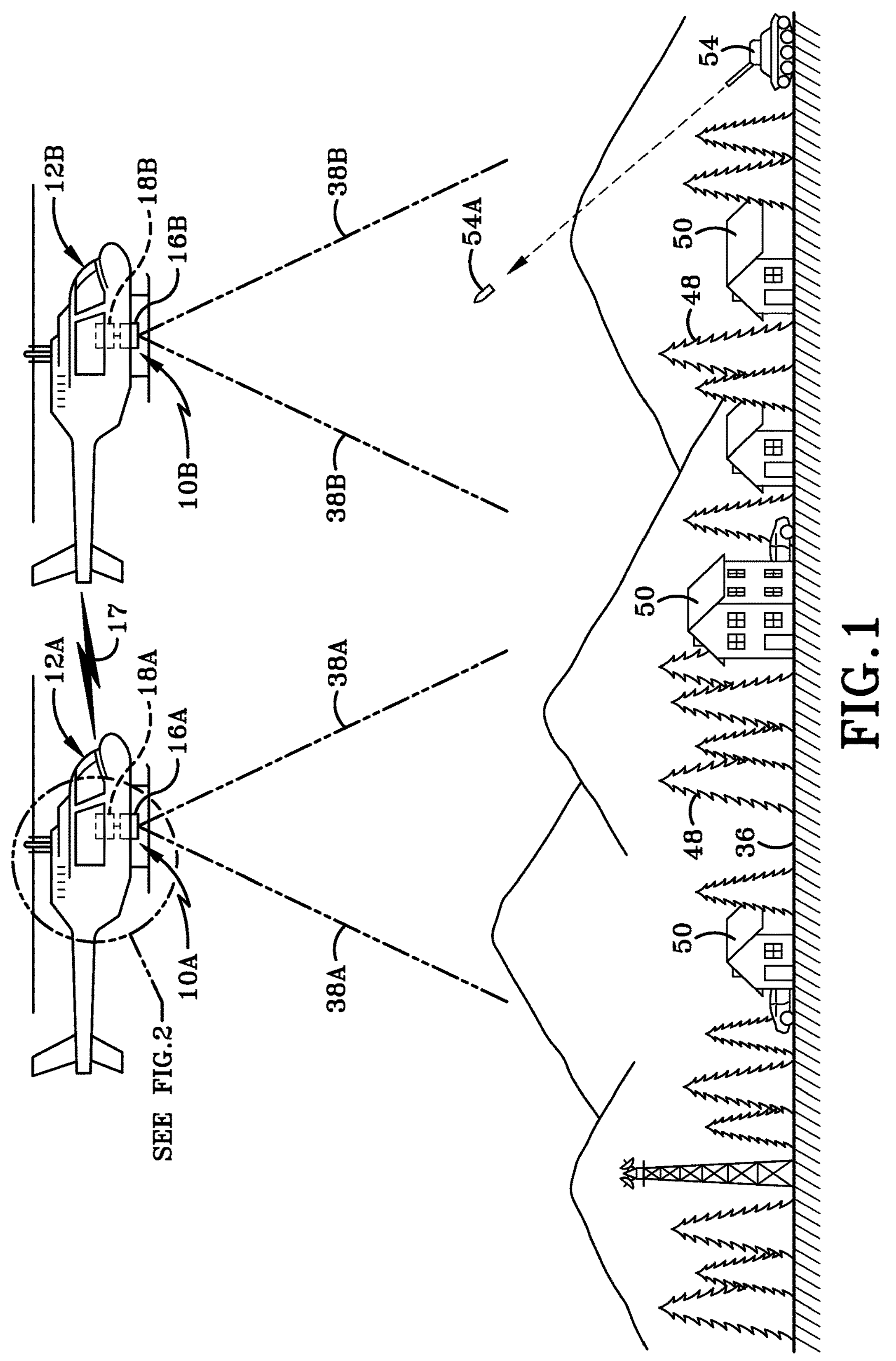
FIG. 1 (FIG. 1) is a diagrammatic view of a platform carrying an exemplary object ranging system of the present disclosure while traveling over an environment in which a field of view from at least one passive sensor is directed towards a geographic landscape.

FIG. 1 diagrammatically depicts an object ranging system to determine a range, range-rate, and time-to-go through a computer implemented process or technique in accordance with certain aspects of the present disclosure and is shown generally at 10. The object ranging system 10 in this example is operably engaged with two platforms that are located near each other. Typically, platforms are considered to be near each other when they are flying or moving in a formation typically within 100-1000 meters of each other. However, "near each other" in the present disclosure refers any distance within which the two platforms are in communication.

System 10 may include a first platform 12A and includes at least one image sensor 16A, at least one processor 18A, wireless communication logic 19A, spectral data logic 20A, spatial data logic 22A, ranging logic 24A, and registration logic 26A. A second platform 12B and includes at least one image sensor 16B, at least one processor 18B, spectral data logic, spatial data logic, ranging logic, and registration logic.

In accordance with one aspect of the present disclosure, the platforms 12A, 12B may be any moveable platform configured to be elevated relative to a geographic landscape 36. Some exemplary moveable platforms 12A, 12B include, but are not limited to, unmanned aerial vehicles (UAVs), manned aerial vehicles, projectiles, guided projectiles, or any other suitable moveable platforms. Further, the moveable platforms can be non-aerial moveable platforms, such as land-based vehicles like tanks or trucks (regardless of whether manned or unmanned), or sea-based vehicles, such as ships or floating platforms (regardless of whether manned or unmanned). However, ranging system 10 is also operable and capable of being implemented on stationary platforms, such as buildings, or other structures like cell phone towers.

When the platforms 12A, 12B are embodied as a moveable aerial vehicle, the platforms 12A, 12B may each include a front end or a nose opposite a rear end or tail. Portions of the ranging system 10 may be mounted to each body, the fuselage, or internal thereto between the nose and tail of the platforms 12A, 12B. While FIG. 1 depicts that some portions of the ranging system 10 are mounted or carried by the platforms 12A, 12B adjacent a lower side of the platforms 12A, 12B, it is to be understood that the positioning of some components may be varied and the figure is not intended to be limiting with respect to the location of where the components of the system 10 are provided. For example, and not meant as a limitation, the at least one sensor 16A is mounted on the platform 12A and sensor 16B is mounted on platform 12B. Furthermore, some aspects of the at least one sensors 16A, 16B may be conformal to the outer surface of the platforms 12A, 12B, respectively. Other aspects of the at least one sensor 16A, 16B may extend outwardly from the outer surface of the platforms 12A, 12B, respectively, and other aspects of the at least one sensor 16A, 16B may be internal to platforms 12A, 12B, respectively.

Each of the at least one sensors 16A, 16B may be a passive sensor. One exemplary passive sensor is an optical sensor mounted on the lower side of the platforms 12A, 12B, respectively. Each of the at least one sensors 16A, 16B is configured to observe scenes remote from the platforms 12A, 12B, respectively, such as, for example, a geographic landscape 36 within its field of view (FOV) 38. Inasmuch as each of the at least one sensors 16A, 16B has a FOV 38A, 38B. In one example, each of the at least one sensors 16A, 16B is an image sensor or imager. Further, when each of the at least one sensors 16A, 16B is embodied as an imager, the imager may be any imager capable of imaging terrain, such as, for example, a visible light imager, infrared (IR), a near-infrared imager, a mid-infrared imager, a far-infrared imager, or any other suitable imager. In one example, the imager has a frame rate of at least 100 frames per second. In another example, the imager has a frame rate of at least 500 frames per second. In yet another example, the imager has a frame rate between approximately 500 frames per second and approximately 1,000 frames per second. Although certain frame rates of the imager have been described, it is to be understood that the imager may have any suitable frame rate.

Each of the at least one sensors 16A, 16B, which may be an IR imager, may be a passive sensor 16 or passive imager, which refers to each of the at least one sensors 16A, 16B configured to view/receives data observed through its FOV 38 of the scene that is being observed, but does not actively produce or generate a source of energy that propagates outward from the sensor to thereafter obtain a received signal (such as that would be common with an active sensor, such as LIDAR or radar).

Each of the at least one sensors 16A, 16B may be one of many sensors on platforms 12A, 12B, such as a plurality of IR sensors or IR imager, each including at least one focal plane array (FPA). Each FPA comprises a plurality of pixels. The IR sensors are able to detect spectral wavelengths. In this present disclosure, the IR sensors are capable of detecting multiple wavelengths in the visible and/or nonvisible spectrum of light. In one particular embodiment, each sensor 16A, 16B captures at least dual-band imagery.

The data or information from pixels that form one image have a spatial orientation relative to other pixels. Adjacent pixels in an image typically have shared or common information to an adjacent pixel in the overall image. The use of spatial data as referred to herein, refers to spatial data in the image. Thus, the present disclosure uses information in an image near a particular pixel to generate a ranging determination of a candidate object 54 or projectile 54A fired from object 54 at that pixel (wherein object 54 or projectile 54A can be referred to generally as an "object" in the appended claims).

Furthermore, when the each of the at least one sensors 16A, 16B is embodied as an IR imager, the imager will have some components that are common to image sensors such as lens, domes, focal plane arrays, and may additionally include processors such as a Graphical Processing Unit (GPU), which may be an exemplary processor 18A, 18B, respectively, and associated processing hardware. Towards that end, a reader of the present disclosure will understand that the at least one sensor 16A, 16B may include standard imaging components adapted to sense, capture, and detect imagery within its FOV 38A, 38B, respectively. The imagery may be in a spectrum that is not viewable to the human eye, such as, for example, near-infrared imagery, mid-infrared imagery, and far-infrared imagery. However, one particular embodiment of the present disclosure utilizes IR imagery.

While the FOVs 38A, 38B in FIG. 1 are directed vertically downward towards the geographic landscape 36, it is further possible for a system in accordance with the present disclosure to have respective sensors 16A, 16B that projects their FOV 38A, 38B outwardly and forwardly from the nose of the platform 12A, 12B or outwardly and rearward from the tail of the platform 12A, 12B, or in any other suitable direction. However, as will be described in greater detail below, certain implementations and embodiments of the present disclosure are purposely aimed downward so as to capture a scene image from the geographic landscape 36 to be used to provide navigation and/or position and/or location and/or geolocation information to the platform 12A, 12B.

Generally, each sensor 16A, 16B has an input and an output. An input to each sensor 16A, 16B may be considered the scene image observed by the FOV 38A, 38B that is processed through the imagery or sensing components within the sensor 16A, 16B, respectively. An output of the sensor may be an image captured by the sensor 16 that is output to another hardware component or processing component.

Figure 2:
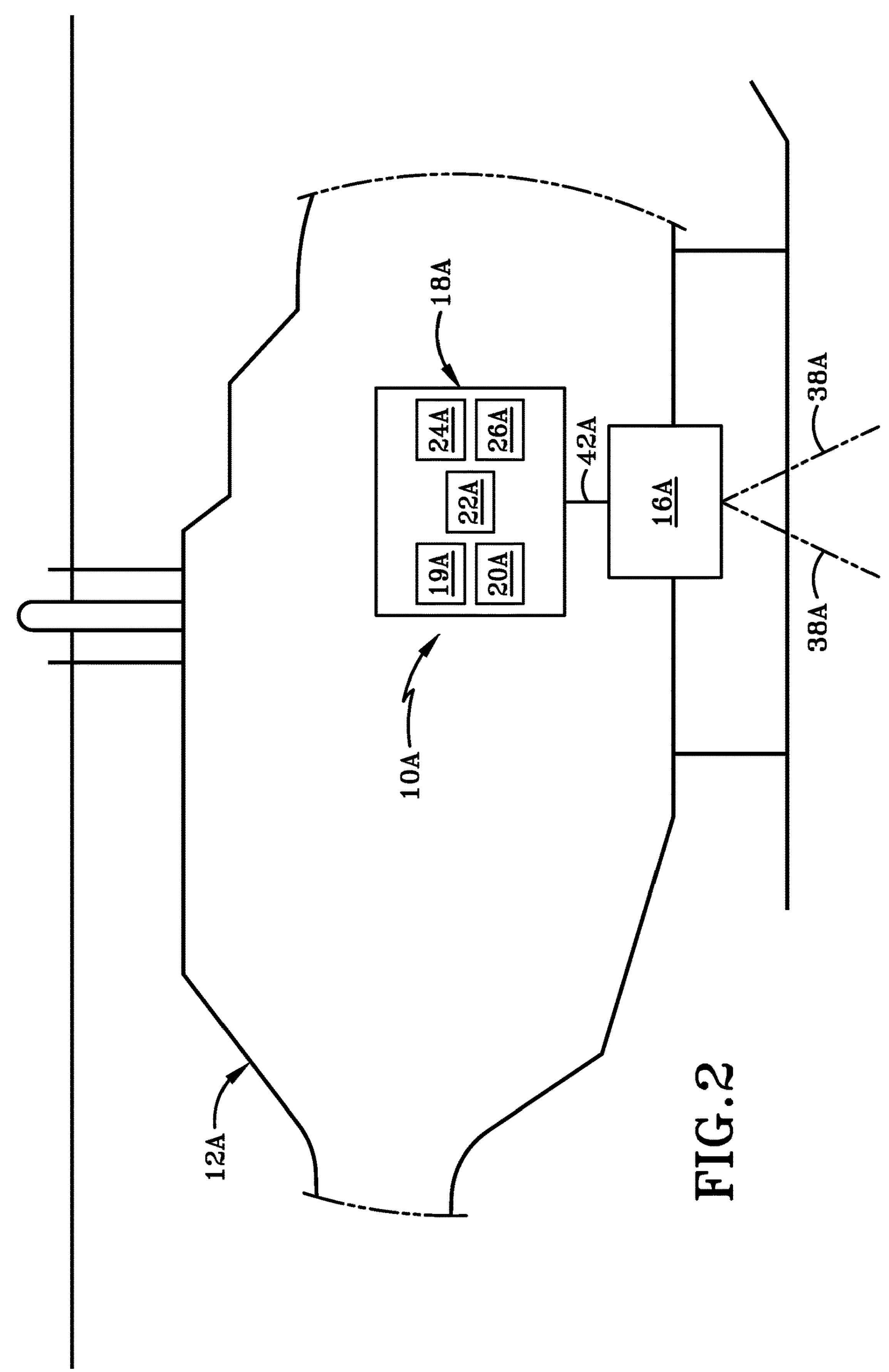
FIG. 2 (FIG. 2) is an enlarged schematic view of a portion of the platform carrying the object classification system as highlighted by the dashed circle labeled "SEE FIG. 2" from FIG. 1

FIG. 2 schematically depicts the configuration of platform 12A, however it is to be understood that the second platform 12B would have a similar configuration. For example, while each of the reference elements associated with first platform 12A are designated with the letter "A", it is to be understood that a similar component on the second platform 12B would have reference elements designated with the letter "B". For example, although not shown in FIG. 2, with respect to the second platform 12B, the wireless communication logic would be designated as 19B, the spectral data logic would be designated as 20B, the spatial data logic would be designated as 22B, the ranging logic would be designated 24B, and the registration logic would be designated as 26B. Thus, it is to be understood that the discussion relating to FIG. 2 and the configuration of components on the first platform 12A would equally apply to the second platform 12B by a reader substituting the suffix "B" for each reference element ending with the suffix "A."

The at least one processor 18A is in operative communication with the at least one sensor 16A. More particularly, the at least one processor 18A is electrically connected with the output of the output of the sensor 16A. In one example, the at least one processor 18A is integrally formed within sensor 16A. In another example, the processor 18A is directly wired the output of the sensor 16A. However, it is equally possible for the at least one processor 18A to be wirelessly connected to the sensor 16A. Stated otherwise, a link 42A electrically connects the sensor 16A to the at least one processor 18A (which may be entirely physically internal to the housing associated with sensor 16A) and may be any wireless or wired connection, integral to the sensor 16A or external to sensor 16A, to effectuate the transfer of digital information or data from the sensor 16A to the at least one processor 18A. The at least one processor 18A is configured to or is operative to generate a signal in response to the data received over the link 42A from the sensor 16A.

In accordance with one aspect of the present disclosure, the processor 18A may be a GPU that is performing the processing functionality to detect the object ranging technique described herein, which may be a portion of a threat warning or countermeasure method or process. The GPU may be located on the platform or it may be located at a remote location separated from the platform, wherein when the GPU is at a remote location wireless signal transmission logic would be present on the platform to send the signal data to a receiver that feeds the signal data to the GPU for processing.

In some implementations, the data that is sent over the link 42A are scene images or video streams composed of sequential frames captured by the sensor 16A that is observing the geographic landscape 36 below through its FOV 38A. As will be described in greater detail below, the at least one processor 18A may include various logics, such as, for example, spectral data logic 20A, spatial data logic 22A, ranging logic 24A, and registration logic 26A, which performs functions described in greater detail below.

With continued reference to FIG. 1, and having thus described the general structure of system 10, reference is now made to features of the geographic landscape 36. For example, and not meant as a limitation, the geographic landscape 36 may include natural features 48, such as trees, vegetation, or mountains, or manmade features 50, such as buildings, roads, or bridges, etc., which are viewable from either platform 12A, 12B through the FOV 38A, 38B of reach respective sensor 16A, 16B. Also within the FOV, there may a candidate object 54 or projectile 54A fired from object 54, which may be a threat or another object of interest. System 10 is configured to determine a range, range-rate, and time-to-go (or time to impact) of the object 54 or projectile 54A. Namely, the system 10 ranges or determines the distance/range that the object 54 or a projectile 54A fired from the object 54 is moving (wherein the projectile 54A can considered one type of object 54) relative to the platforms 12A, 12B based on shared information between the two platforms 12A, 12B.

The system 10 uses each sensor 16A, 16B to capture a scene image from a scene remotely from each platform 12A, 12B and each processor 18A, 18B generates a signal in response to the sensors 16A, 16B capturing the scene image. Metadata may be provided for each captured scene image. For example, and not meant as a limitation, the metadata may include a frame number of the scene image within a flight data set, a latitude position of each platform 12A, 12B in radians, a longitude position of each platform 12A, 12B in radians, an altitude position of each platform 12A, 12B in meters, a velocity of each platform 12A, 12B in meters per second, and a rotation of each platform 12A, 12B in degrees. Metadata associated with each sensor 16A, 16B may also be provided, such, as, for example, mounting information related to each sensor 16A, 16B. Although examples of metadata have been provided, it is to be understood that the metadata may include any suitable data and/or information.

Wireless communication logic 19A may be coupled at least one non-transitory computer readable storage medium having instructions encoded thereon that, when executed by the at least one processor 18A, implements operations to transmit and receive wireless signals of information or data across wireless link 17 (FIG. 1) that links the first platform 12A and the second platform 12B to permit sharing of data across the link 17. The logic 19A would necessarily include one or more transceivers to effectuate the transmission and reception of the signals across link 17. While not depicted in FIG. 2, similar wireless communication logic would be present on second platform 12B that can be referred to second wireless communication logic. In one example, the data is communicated to a centralized location for processing which may be an air-borne or on the ground/water. The centralized location typically has communications with the multiple platforms as well as with other assets that can be used or deployed to counter the object headed for the platforms. The communications in one example is secure and not subject to being understood or manipulated by third parties.

Spectral data logic 20A includes at least one non-transitory computer readable storage medium having instructions encoded thereon that, when executed by the at least one processor 18A, implements operations to obtain a single band or multiple bands (i.e. multichannel-different parts of the infrared spectrum) of image data depicting object 54 or projectile 54A that are captured together in an image or in a frame of a video stream from the sensor 16A. While not depicted in FIG. 2, similar spectral data logic would be present on second platform 12B that can be referred to second spectral data logic.

Spatial data logic 22A includes at least one non-transitory computer readable storage medium having instructions encoded thereon that, when executed by the at least one processor 18A, implements operations to determine the spatial locality or spatial position of a candidate object 54 or projectile 54A relative to a pixel on the focal plane array within image data from an image or from a frame of a video stream from the sensor 16A. While not depicted in FIG. 2, similar spatial data logic would be present on second platform 12B that can be referred to second spatial data logic.

Ranging logic 24A includes at least one non-transitory computer readable storage medium having instructions encoded thereon that, when executed by the at least one processor 18, implements operations to perform calculations to solve the range, range-rate, and time-to-go with respect to object 54 or projectile 54A relative to platform 12A based on a review of information obtained from sensor 16A. While not depicted in FIG. 2, similar ranging logic would be present on second platform 12B that can be referred to second ranging logic.

The registration logic 26A may include at least one non-transitory computer readable storage medium having instructions encoded thereon that, when executed by the at least one processor 18A, implements operations to register the ranging determination from ranging logic 24A. While not depicted in FIG. 2, similar registration logic would be present on second platform 12B that can be referred to second registration logic.

The logic blocks 19A, 20A, 22A, 24A and 26A are described herein as separate blocks, however in one embodiment these blocks represent modules within a program and are processed by the at least one processor 18.

The system of the present disclosure performs or effectuates the execution of functions to determine range, range-rate, and time-to-go using passive sensors 16A, 16B. Using two offset sensors 16A, 16B enables system 10 to triangulate the three-dimensional (3D) position of the object 54 or projectile 54A. To account for the resulting position estimates being too noisy to allow a useable range-rate and time-to-go to be estimated in a timely manner, the system 10 exploits the fact that the incoming projectile's range will likely be a smooth and monotonically decreasing function of time and uses this as a priori information. This allows the system to perform a polynomial curve fit to the local measurements. Thereafter, the system takes the derivative of this polynomial to yield a smooth function approximating range-rate. Then, the range-rate is utilized to obtain the time-to-go or time to impact.

Additionally, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Having thus described the components of the system that implement the ranging techniques, protocols, process, or methods detailed herein, reference is now made to its operation and the algorithmic operations that accomplish said operation of the ranging system 10.

The present disclosure provides a technique executed by system 10 to utilize a priori knowledge or data of the fact that the object 54 or projectile 54A is moving towards one of the platforms 12A, 12B in a relatively straight line between the object 54 or projectile 54A and the platform to a collision point. The system 10 of the present disclosure exploits this a priori knowledge or data to perform a polynomial curve fit function. The curve fit function utilizes the noisy measurements to generate a smooth curve that is fit to what the system would expect an approaching projectile 54 or projectile 54A would or should behave. From this information, the derivative may be taken to result in a smooth curve representing a range-rate. Then, the ratio of the range and the range-rate results in a time-to-go estimation for the collision point.

One exemplary instantiation of the present disclosure is a special case to a general passive ranging problem where the system 10 already knows ahead of time the behavior of the object or projectile 54A that it is being tracked by sensors 16A, 16B via passive IR imagery. The platform or sensors 16A, 16B know the general behavior of the object 54 or projectile 54A beforehand because the system 10 of the present disclosure should be used in conjunction with a missile-warning algorithm or threat warning system, though it is not absolutely required. Thus, in accordance with an aspect of the present disclosure, the techniques provided herein may be a further instantiation or incorporation to a threat warning system that is specifically trying to detect the time to impact of a detected threat (i.e., object 54 or projectile 54A).

The system of the present disclosure may be used in conjunction with the threat warning system that preprocesses and already identifies that the incoming projectile 54A is behaving like a missile or other threat to one of the platforms 12A, 12B. The threat warning system on one or both of the platforms 12, 12B identifies that the projectile 54A is a threat. Then, the sensors 16A, 16B lock onto the projectile 54A and track it to determine the time-to-go until the collision point using the range and range-rate ratio described herein. Thus, the techniques disclosed herein may be considered a supplement or further advancement to be used subsequent to the determination that the object of interest (i.e., object 54 or projectile 54A) is a threat and the time to impact it needs to be determined utilizing only passive sensors 16A, 16B. Stated otherwise, the threat warning system may determine that there is basic missile-like or threat-like behavior signatures of the object 54 or projectile 54A. Then, the system 10 of the present disclosure can be utilized to determine when that threat will impact one of the platforms 12A, 12B. Evasive maneuvers and/or counter-measures can be deployed in response to the information about the object from the processing noted herein.

Regarding the communications between the first platform 12A and the second platform 12B over the wireless data link 17, there is a message data type that is a missile data warning track-type message that would be shared continuously by the platforms 12A, 12B. Other track types may also be shared across link 17. For example, any number of tracks could be shared between the platforms over link 17. However, with respect to the threat or projectile 54A, the missile warning track information would have one or more data bit(s) indicating that it is a missile warning or threat warning track. Thus, when one of the platforms receives or indicates that there is a threat tracking towards that specific platform, that platform may search through the wingman's or second platform's missile warning tracks and determine which one of the second platform's tracks is inertially consistent with the missile warning track of the first platform. If the system 10 determines there is a match between the two tracks (based on inertial consistency), then that match of angular data associated with each respective track can be used to triangulate the location of the object. Particularly, the second platform would be operating or running a similar process with respect to its tracks. Thus, there can be more than one platform that is performing this triangulation process to determine time-to-go of the object.

Figure 3:
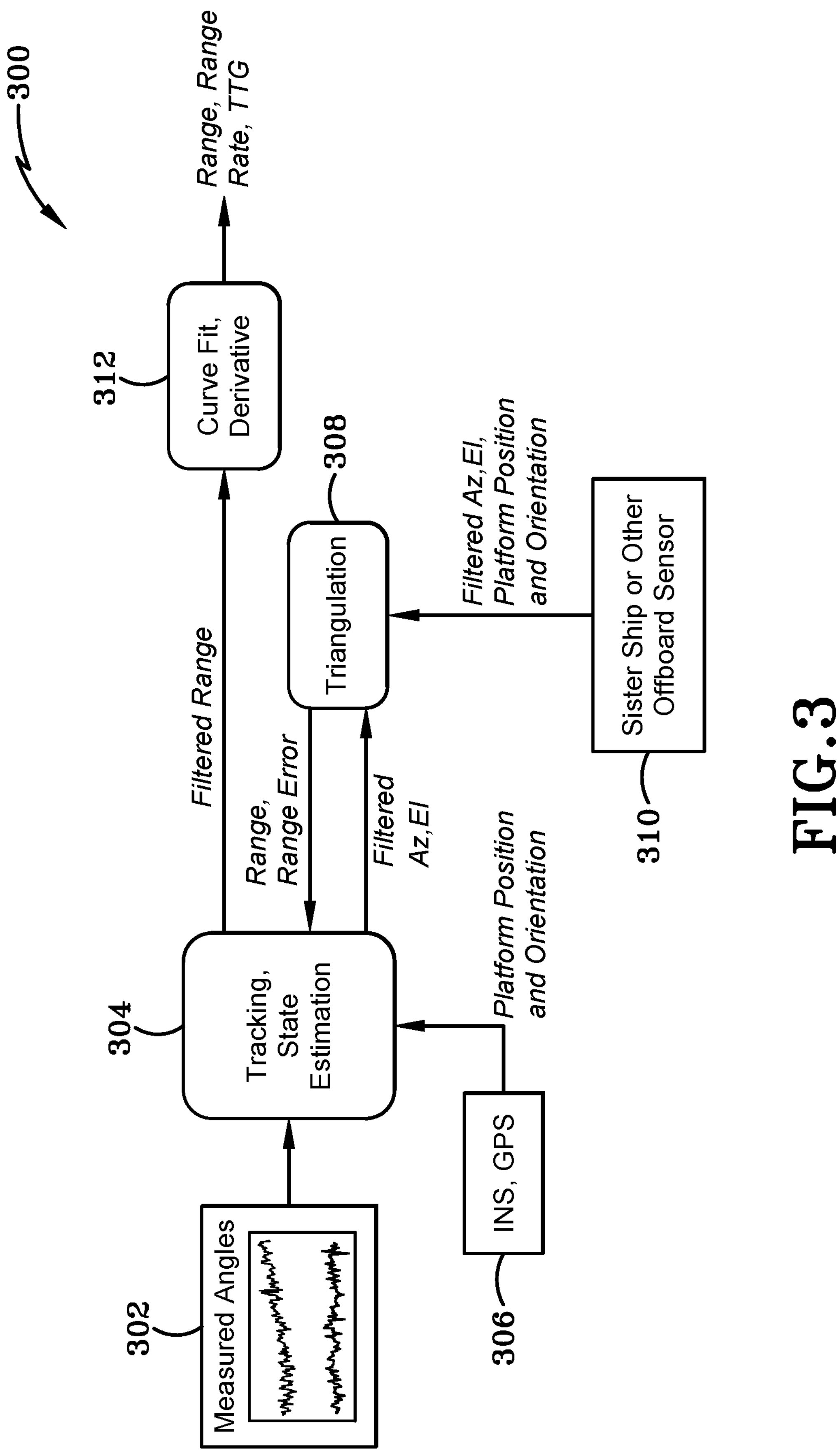
FIG. 3 (FIG. 3) is a flow chart depicting an exemplary method according to various exemplary aspects of the object ranging technique of the present disclosure.

FIG. 3 is a flow chart representing a method of operation of system 10, and the method is shown generally at 300. The measured angles are identified generally at box 302 and are generated from a detection technique in the sensors 16A, 16B that are operative in series to develop a track or list of pixel positions with time as detected. Alternatively, they can operate in parallel. This forms a track that results in angle measurements, namely, elevation and azimuth angles. The azimuth and elevation angles are provided from box 302 into a tracking and state estimator (which is part of ranging logic on each platform), which is shown generally at 304. The measured angles represented in box 302 are transformed into a common inertial frame so that they may be compared to similar data obtained from the second platform or wingman (i.e., the other of platform 12A or 12B). In order to transfer the data to a common reference frame, the inertial navigation system (INS) data and GPS data, which is shown generally at box 306, is utilized to generate the common reference frame from the second platform. The INS and GPS data that represent the platform position and orientation are provided to the tracking and state estimator.

With respect to the tracking and state estimation shown generally at 304, state estimation refers to the state of the missile, object 54, or projectile 54A, wherein state refers to the 3D position of the missile, object 54, or projectile 54A, and the 3D velocity of the threat/projectile 54A. Stated otherwise, the step represented by box 304 estimates a full 3D position of the projectile 54A from two-dimensional measurements.

The state estimator shown generally at box 304 results in an output of a filtered azimuth and elevation angle. The filtered azimuth and elevation angles are provided to a subsequent triangulation technique, represented by box 308 (and is physically implemented via the ranging logic), that performs triangulation. An exemplary filter for the state estimator at step 304 is a non-linear Kalman filter or extended Kalman filter. The filters, regardless of which type is used, smooth the incoming data as well as predict the next step to form a state estimation.

With continued reference to the triangulation shown at box 308, filtered azimuth and elevation angles are inputs to the triangulation step/box 308. Additionally, the second platform 12B or sister ship off board sensor data shown generally at box 310 is also input into the triangulation step/box 308. The format with which the other sensor data from step/box 310 is provided to the triangulation data is a filtered azimuth and elevation platform positioning orientation. The triangulation occurring at step/box 308 results in 3D position estimates, which is then able to determine a range because the platform's own position is known via its onboard position data from step/box 306.

The triangulation occurring in step/box 308 triangulates and locates the position of the object or projectile 54A moving towards the platform relative to the known positions of the first platform 12A and the second platform 12B. The triangulation at step/box 308 has an output that results in a range and range error that is fed back, and thereby defines a feedback loop, to the tracking and state estimator at step/box 304 for further use in the state estimator's subsequent processing. Thus, the range and range error may be feedback inputs back to the tracking and state estimator at box 304. After the range and range error have been fed back to the tracking and state estimator at box 304, it creates or results in a filtered range that is provided to a curve fit and derivative process, which is shown generally at box 312.

With respect to the curve fit and derivative process shown at box 312, which is part of ranging logic 24A (or second ranging logic on second platform 12B), there are a number of manners to curve fit a polynomial set of measurements that would enable the range and range-rate to be determined. One exemplary technique is a Savitzky-Golay filter for polynomial fits. The Savitzky-Golay filter is a type of algorithm/technique or filter that can perform a polynomial fit to a list of measurements. The output of the curve fit step 312 is a closed-form equation for range as a function of time. In one example, a closed-form function of time refers to the exploitation of a priori knowledge of the track of the object as heading towards the platform and performing a polynomial curve fit function.

So for example, one exemplary closed-from equation that is a function of time could be:

$$\text{Range} = At^2 + Bt + C$$

where A, B, and C are constants. Noteworthy, this exemplary function is simply an example of a closed-form equation representing the range based on the triangulation from step/box 308, to indicate the functional process of method 300 as it relates to a function of time. Thus, method 300 provides a closed-form equation for the range of object 54A relative to the platform as a function of time.

From the closed-form function, the system 10 calculates the derivative of this closed-form equation to obtain range-rate, wherein the derivative of a polynomial is another polynomial of lower order. So for this particular example, the derivative of the exemplary range closed-form equation would be:

$$RangeRate = 2At + B$$

The time-to-go to the collision point is established by a ratio of the range at any given time divided by the range-rate, which approximates or results in the range-rate estimate. For example:

$$\text{Time to Go}_{CollisionPoint} = \frac{\text{Range}}{RangeRate}$$

In one instantiation, the time-to-go is an estimate because the velocity or acceleration of the projectile 54A will be decreasing as it is approaching the platform. Thus, the system may account for this deceleration of the projectile 54A. To account for the deceleration of the projectile 54A, which is typically due to drag forces, the system accounts for the drag on projectile 54A being proportional to the square of the velocity. So given an estimate of the range and the range-rate, the system of the present disclosure is able to estimate the deceleration by the velocity of the projectile 54A. Then, the deceleration of the projectile would be accounted for in method 300 in the curve fit and derivative step 312 to correct the time-to-go through another feedback loop. Essentially, the further estimation may be a secondary feedback loop to the curve fit and derivative step at 312 to provide future estimations from the current instantaneous range and range-rate.

Once the time-to-go is approximated, the time-to-go information may be provided to the threat warning system or the countermeasure system to enable the platform 12 deploy a countermeasure, such as a flare or a chaff, or enable the pilot to take an evasive action.

Having thus described the method of operation, it can be seen that system 10 is able to result in a less noisy determination and therefore a faster calculation via the use of the curve fit derivative step subsequent to triangulating the location of the projectile 54A. Under traditional techniques, the curve fitting would not be possible because, in the general case, the system would not know what type of curve is needed to fit to the target. This is typically not known because if a system is tracking another aircraft, it can fly towards the platform for a period of time then turn and go in a different direction. Thus, since the system has the a priori knowledge based on the threat warning system that the object 54 or projectile 54A is tracking towards the platform, it is able to establish a monotonically decreasing function over time. The range that is based on the function over time is a very well behaved monotonically decreasing function. This information can be exploited to force the state to converge very quickly, whereas it would normally take a significant amount of time.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer program product including at least one non-transitory computer readable storage medium having instructions encoded thereon that, when executed by one or more processors, implement a process track an object, the process comprising:

detecting the object;

tracking the object using a first passive sensor on a first platform and obtaining first angular data from tracking the object;

determining a range of the object from the first platform as a closed-form function of time;

deriving a range-rate of the object from the closed-form function of time;

approximating a time-to-go until a collision point between the object and the first platform, wherein approximating the time-to-go is based on a ratio of the range to the range-rate; and tracking the object using a second passive sensor on a second platform and obtaining second angular data from tracking the object; and sharing at least one of the first angular data and the second angular data across a communication link between the first platform and the second platform;

wherein determining the range of the object from the first platform as a closed-form function of time is accomplished by triangulating a position of the object based on the first angular data and the second angular data.

2. The computer program product of claim 1, further comprising:

generating the range and a range error in response to triangulating the position of the object based on the first angular data and the second angular data; and providing the range and the range error to a state estimator; and creating, via the state estimator, a filtered range based on the range and the range error.

3. The computer program product of claim 2, wherein creating the filtered range comprises:

curve fitting a filter to a set of polynomial measurements representative of position of the object, wherein performing the curve fitting results in the closed-form function of time.

4. The computer program product of claim 1, further comprising:

sharing a message data type representative of a warning track of the object; wherein the sharing of the message data types occurs continuously between the first platform and the second platform for a period of time.

5. The computer program product of claim 4, wherein the message data type representative of the warning track of the object includes an indicator of a collision between one of the first platform and the second platform and the object.

6. The computer program product of claim 5, further comprising:

determining, via logic at the first platform, whether there is a corresponding warning track of the object located by the second passive sensor on the second platform.

7. The computer program product of claim 6, wherein determining whether there is the corresponding warning track is accomplished by determining whether there is inertially consistent similarity in the corresponding track from the second passive sensor and the warning track from the first passive sensor.

8. The computer program product of claim 7, further comprising:

matching the first angular data and the second angular data in response to a determination that there is inertially consistent similarity in the corresponding track from the second passive sensor and the warning track from the first passive sensor;

triangulating the position of the object in response to matching the first angular data and the second angular data.

9. The computer program product of claim 1, wherein approximating the time-to-go until the collision point between the object and the first platform based comprises:

estimating acceleration or deceleration of the object relative to the first platform.

10. The computer program product of claim 9, further comprising:

providing estimated acceleration or deceleration of the object to a state estimator to create a filtered range.

11. The computer program product of claim 10, wherein providing estimated acceleration or deceleration of the object to the state estimator occurs subsequent to deriving the range-rate.

12. The computer program product of claim 1, further comprising:

providing a signal representative of the time-to-go to a counter measure system.

13. The computer program product of claim 1, further comprising:

presuming, based on a priori knowledge from the object having been detected, that the object is moving toward the first platform.

14. The computer program product of claim 13, further comprising:

determining a position of the object based on tracking the object using the first passive sensor;

curve fitting a function from noisy measurements from determining the position of the object, wherein curve fitting the function generates a smooth curve that approximates expected behavior of the moving object.

15. An object ranging method comprising:

tracking, via a first passive sensor on a first platform, an object that is moving;

obtaining first angular data of the object relative to the first platform via the first passive sensor;

tracking, via a second passive sensor on a second platform, the object;

obtaining second angular data of the object relative to the second platform via the second passive sensor;

triangulating a location of the object based on first angular data from the first passive sensor and the second angular data from the second passive sensor and obtaining a smooth and monotonically decreasing closed-from function representative of a range of the object based on its location at a point in time;

performing a polynomial curve fit of the first angular data relative to the smooth and monotonically decreasing closed-form function;

taking a derivative of the polynomial curve fit of angular data to that results a smooth function approximating a range-rate of the object.

16. The object ranging method of claim 15, further comprising:

approximating a time-to-go until a collision point between the object and the first platform based, wherein approximating the time-to-go is based on a ratio of range to range-rate.

17. An object ranging system:

a first platform;

a first passive sensor on the first platform, wherein the first passive sensor is configured to track an object located remotely from the first platform;

first spatial data logic on the first platform to generate first angular data of the object relative to the first platform, wherein the first angular data that is generated is based on raw imagery from the first passive sensor;

first ranging logic on the first platform to determine a location of the object relative to the first platform based on the first angular data;

first wireless communication logic on the first platform;

a second platform configured to move in formation with the first platform;

a second passive sensor on the second platform, wherein the second passive sensor is configured to track the object located remotely from the second platform;

second spatial data logic on the second platform to generate second angular data of the object relative to the second platform, wherein the second angular data that is generated is based on raw imagery from the second passive sensor;

second ranging logic on the second platform to determine the location of the object relative to the second platform based on the second angular data;

second wireless communication logic on the second platform, wherein the first wireless communication logic and the second wireless communication logic establish a wireless link for transfer of data between the first platform and the second platform;

wherein one of the first ranging logic and the second ranging logic derives a range of the object from one of the first platform and the second platform as a closed-form function of time, and thereafter derive a range-rate of the object relative to one of the first platform and the second platform as a function of time;

wherein one of the first ranging logic and the second ranging logic approximates a time-to-go until a collision point between the object and one of the first platform and the second platform, wherein approximation of the time-to-go is based on a ratio of range to range-rate.

18. The object ranging system of claim 17, further comprising:

wherein one of the first ranging logic and the second ranging logic generates the range and a range error in response to determination of the location of the object based on the first angular data and the second angular data; and a state estimator that is provided the range and the range error to create a filtered range;

wherein one of the first ranging logic and the second ranging logic curve fits a filter to a set of polynomial measurements represented by at least, wherein performing the curve fitting results in the closed-form function of time.

19. The object ranging system of claim 17, further comprising:

a message data type that is shared across the wireless link, wherein the message data type is representative of a warning track of the object; wherein the sharing of the message data types occurs continuously between the first platform and the second platform for a period of time;

wherein the message data type representative of the warning track of the object includes an indicator of a collision between the object and one of the first platform and the second platform;

wherein the first ranging logic determines whether there is a corresponding warning track of the object located by the second passive sensor on the second platform, wherein determination of whether there is the corresponding warning track is accomplished by determining whether there is an inertially consistent similarity in the corresponding track from the second passive sensor and the warning track from the first passive sensor, and if consistent, then the first angular data and the second angular data are matched to triangulate the location of the object.

* * * * *